Nov. 17, 1964    H. B. HUNTRESS ETAL    3,157,033
RAILROAD BRAKES
Filed March 16, 1962                4 Sheets-Sheet 1

INVENTORS.
HOWARD B. HUNTRESS
THOMAS S. TAYLOR
BY
Wallace Kinzer and Dorn
ATTORNEYS Nov. 17, 1964 H. B. HUNTRESS ETAL 3,157,033
RAILROAD BRAKES
Filed March 16, 1962 4 Sheets-Sheet 2

INVENTORS.
HOWARD B. HUNTRESS
THOMAS S. TAYLOR
BY
Wallace, Kinzer and Dorn
ATTORNEYS INVENTORS.
HOWARD B. HUNTRESS
THOMAS S. TAYLOR
BY
Wallace Kinzer and Dorn
ATTORNEYS

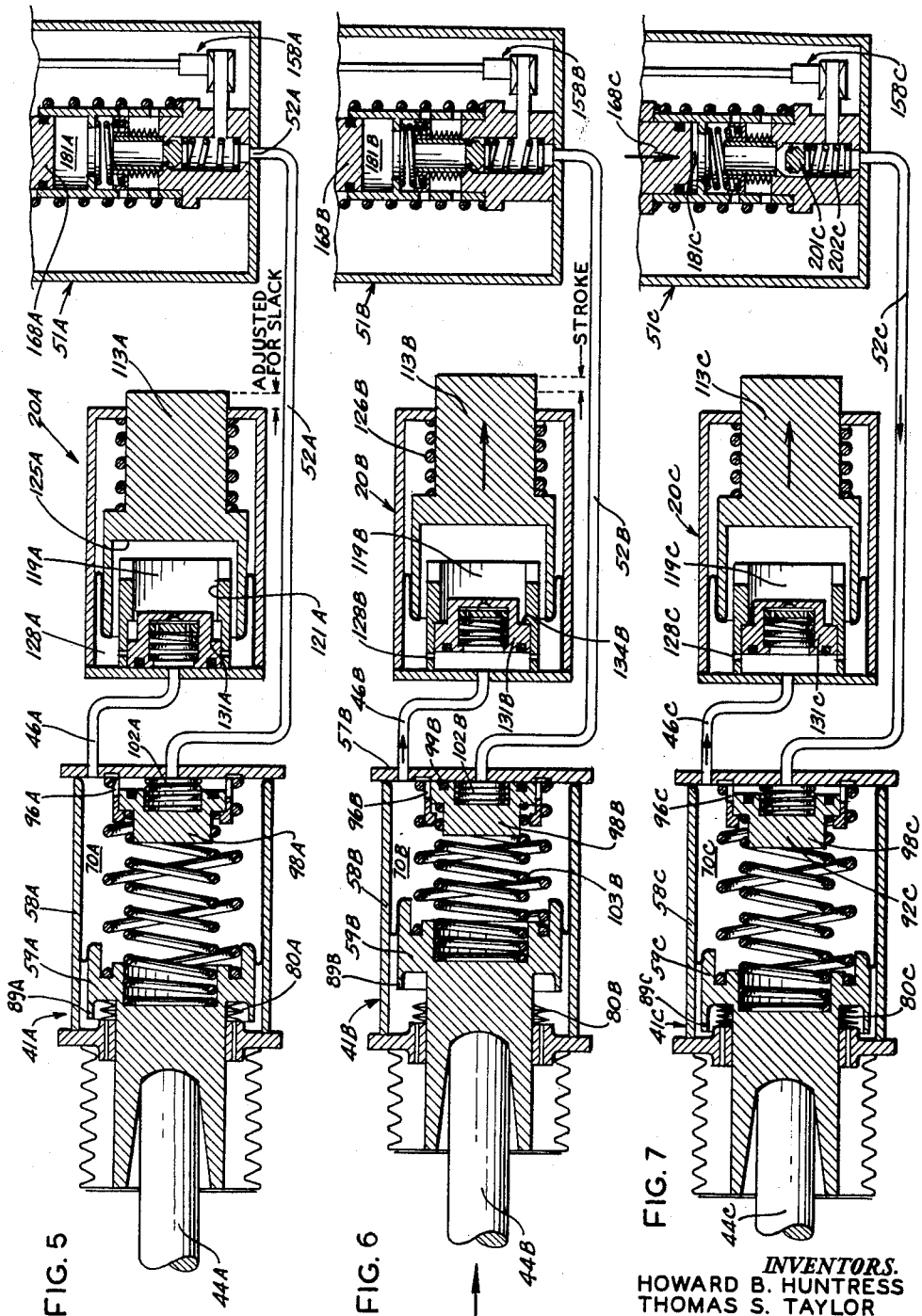

United States Patent Office 3,157,033
Patented Nov. 17, 1964

3,157,033
RAILROAD BRAKES
Howard B. Huntress and Thomas S. Taylor, Suffern, N.Y., assignors to American Brake Shoe Company, New York, N.Y., a corporation of Delaware
Filed Mar. 16, 1962, Ser. No. 180,127
1 Claim. (Cl. 60—54.6)

This invention relates to brake structure for railroad vehicles, and in particular to a master cylinder for use in the hydraulic brake system for actuating the brakes of a railroad car. This application is partly a division and partly a continuation-in-part of application Serial No. 850,697, filed November 3, 1959, which has matured into Patent No. 3,053,349, granted September 11, 1962.

The majority of railroad vehicles now in use utilize a mechanical linkage for transmitting a braking force from an air cylinder of a pneumatic system to individual brake shoes which are suspended adjacent the wheels of the vehicle. This mechanical system is relatively heavy and incorporates an intricate linkage arrangement which introduces undesirable forces on the trucks and car body.

Under the present invention, there is substituted a hydraulic system for the mechanical linkages now in use in railroad cars in a manner such that the hydraulic system utilizes the existing pneumatic system as a signal system and power source. Moreover, the braking action in a vehicle equipped with the present hydraulic system is compatible with railroad vehicles now in use but not provided with the present hydraulic brake system. This enables the vehicle so equipped to be used in interchange and still perform its braking function when associated with cars equipped with a standrad air-mechanical brake system.

After repeated applications of the vehicle brakes over extended periods of time in any braking system, the individual brake shoes are worn down by frictional contact with the wheels to such an extent as to necessitate adjustment so that the brake shoes all maintain proper clearance with their respective wheels. This is important in railroad cars in order that the air cylinder travel will not be excessive when applying the brakes.

Under the present invention, individual hydraulically actuated wheel cylinders are employed, each including slack adjuster mechanism. A master cylinder is directly actuated by the pneumatic system already present on the railroad car, and the wheel cylinders are arranged to receive hydraulic pressure from the master cylinder. A hand pump in association with a gravity feed reservoir is afforded for manually actuating the brakes when necessary. The master cylinder is sealed by a long-stroke diaphragm, and is in communication with the conduit from the hand pump through a normally open valve that closes upon actuation of the master cylinder. To afford a master cylinder of such construction as to enable the brakes to be thus actuated advantageously and effectively without having the master cylinder pass a port to avoid pumping to the reservoir, by either a pneumatic signal or a manually generated hydraulic force, is the primary object of this invention. Another object of this invention is to equip the master cylinder with spring means capable of converting the master cylinder into an accumulator which will compensate for many conditions hereinafter explained.

Other and further objects will be apparent from the following description and claim and are illustrated in the accompanying drawings which, by way of illustration, show a preferred embodiment of the present invention and the principle thereof and what is now considered to be the best mode contemplated for applying that principle. Other embodiments of the invention embodying the same or equivalent principles may be used and structural changes may be made as desired by those skilled in the art without departing from the present invention and purview of the appended claim.

In the drawings:

FIGS. 5, 6 and 7 are somewhat schematic views showing different positions or conditions of the present brake system.

Figure 1:
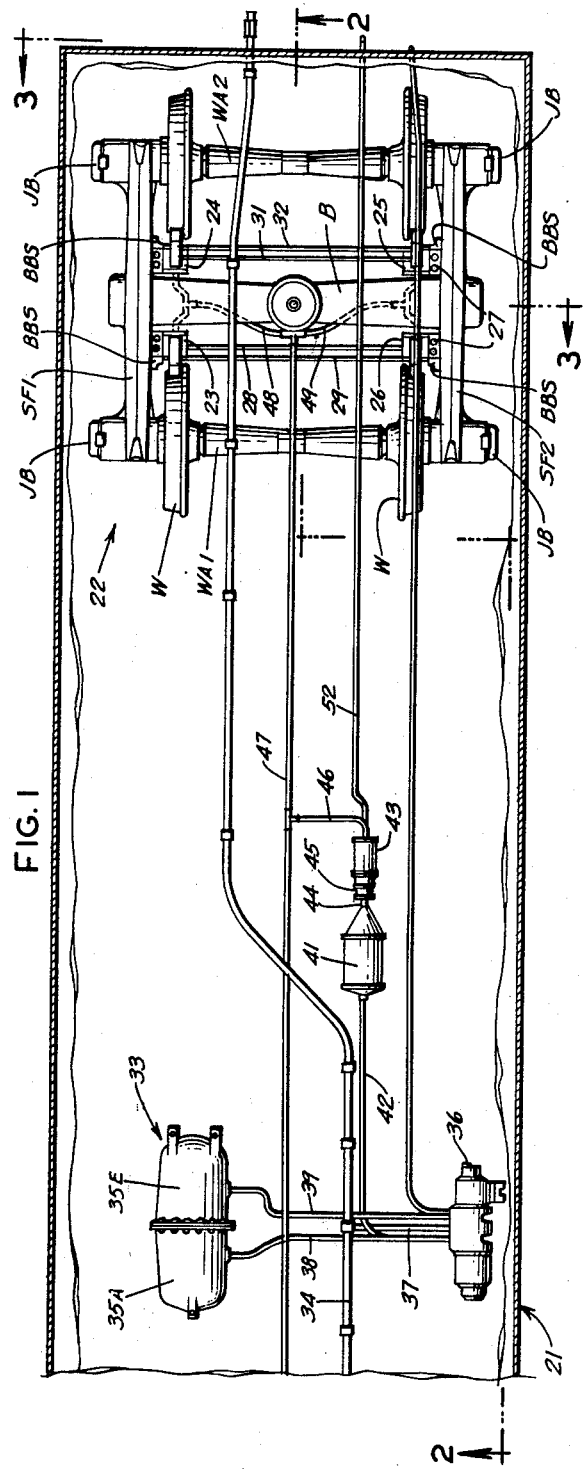
FIG. 1 is a fragmentary plan view of the frame of a railroad vehicle showing the manner in which the present brake system is incorporated therein.
Figure 2:
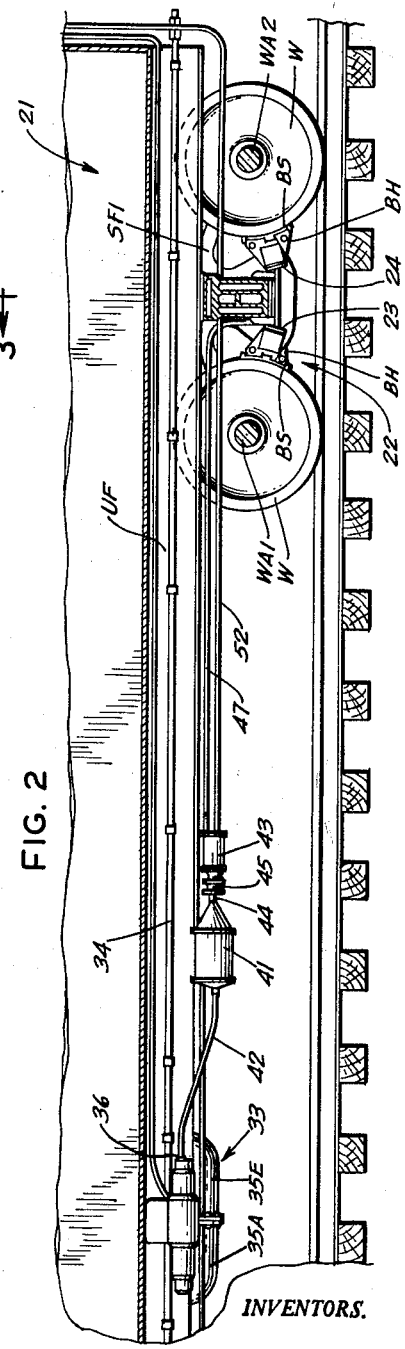
FIG. 2 is a sectional view taken on the line 2—2 of FIG. 1.
Figure 3:
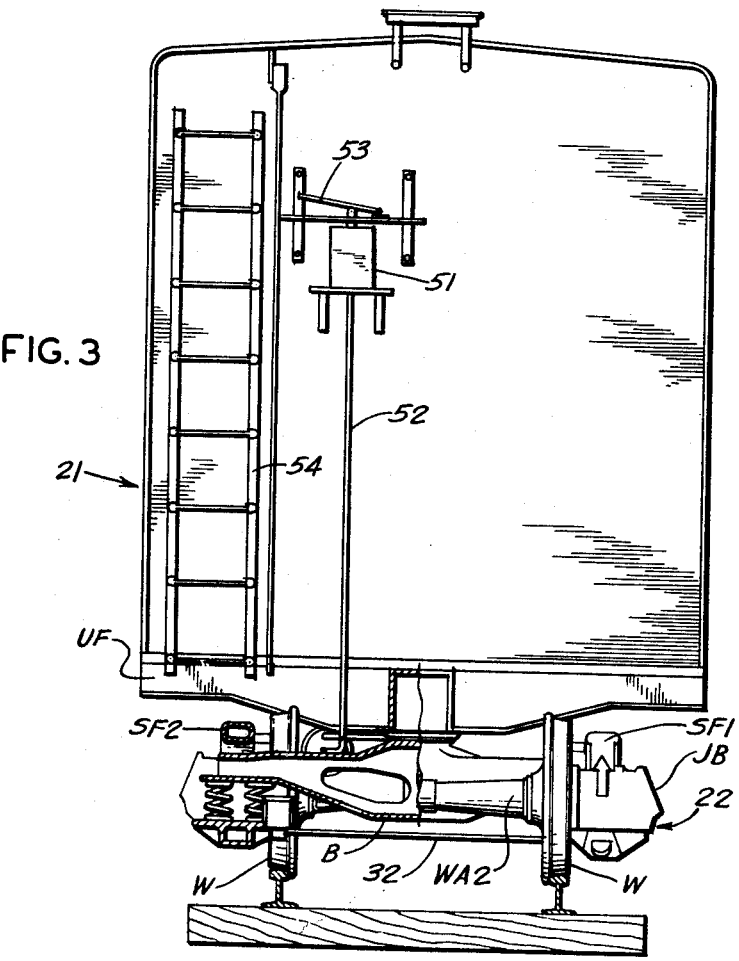
FIG. 3 is an end elevation, partly in section, of the railroad vehicle taken in the direction of the arrows 3—3 in FIG. 1.

Referring now to FIGS. 1–3 of the drawings, a railroad vehicle, shown as a box car, is designated generally by the reference numeral 21. The car 21 includes an under frame UF and car trucks at either end of the car. One truck 22 is illustrated in FIGS. 1–3. The truck 22 comprises a bolster indicated by the reference character B, two side frames SF1 and SF2, and two wheel axles WA1 and WA2. The axles are provided with wheels W in the usual manner and are rotatably mounted in journal boxes JB on the side frames in a conventional manner.

A plurality of individual hydraulic wheel cylinders 23, 24, 25 and 26 are mounted adjacent each of the wheels W of the railway car 21. As illustrated in FIG. 1, the side frames include brake beam slots BBS which are formed on the inner sides of the side frames and are normally employed with unit brake beams in a conventional mechanical linkage. The wheel cylinders 23 to 26 are each formed with a projecting flange and are mounted on the brake beam slots BBS by bolts 27 which are passed through apertures in the flanges of the wheel cylinders. As best viewed in FIG. 2, brake heads BH are carried by the individual wheel cylinders and brake shoes BS are in turn mounted on the brake heads BH. The brake heads for the wheel cylinders 23 and 26 are tied together by a pair of upper and lower tie rods 28 and 29 respectively, and the brake heads for the wheel cylinders 24 and 25 are likewise tied together by a pair of upper and lower tie rods 31 and 32. The brake heads BH are mounted on the wheel cylinders in a manner such that the brake heads are movable laterally with respect to the wheel cylinders by the connecting tie rods to take care of the lateral movement which must be permitted to the wheel and axle as described in the aforesaid application.

The railroad car 21 includes a pnueumatic system designated generally by the reference numeral 33. The pneumatic system 33 includes a main air line 34 which connects each car in the train to a common source of air pressure and also includes auxiliary and emergency air reservoir tanks 35A and 35E. A brake-regulating valve 36 is connected to the main air line 34 by a conduit 37 and is connected to the auxiliary and emergency reservoir tanks by conduits 38 and 39 respectively. The pneumatic system 33 also includes a main air cylinder 41 which is connected to the brake regulating valve 36 by a conduit 42.

The main air cylinder 41 is connected to actuate a hydraulic system which includes a hydraulic master cylinder 43 and the individual wheel cylinders 23 to 26 heretofore described as being mounted on the side frames SF1 and SF2. As viewed in FIGS. 1 and 2, a shaft 44 of the main air cylinder is received within an end plate of a dust guard bellows 45 mounted at one end of the master cylinder 43. As will be described in greater detail with reference to FIG. 4 hereinbelow, the shaft 44 is operative to move an internal piston within the master cylinder to supply pressurized hydraulic fluid to each of the individual wheel cylinders to initiate a braking action. Conduit means are connected between the master cylinder and the wheel cylinders for the purpose of transmitting such pressurized fluid. These conduit means comprise a first conduit 46 which is directly connected to the master cylinder and joined in a T-connection to a conduit 47 which extends along the length of the car 21 between the car trucks. Branch conduits 48 and 49 interconnect the conduit 47 with the wheel cylinders adjacent each of the side frames.

An hydraulic reservoir and a manually actuated hydraulic pump, which affords a hand brake, are each connected to the master cylinder 43 through a common hydraulic conduit. As viewed in FIG. 3, a tank 51 is mounted in a fixed position at one end of the boxcar 21. The tank 51 contains hydraulic fluid and thus affords a reservoir of hydraulic fluid for the master cylinder 43. A conduit 52 interconnects the tank 51 and the master cylinder 43. As described in greater detail in the aforesaid application, a pump is immersed within the fluid contained within the tank 51 and may be actuated by means of a hand lever 53 to pump a pressurized hydraulic fluid through the conduit 52 to the master cylinder and through the conduits 46 and 47 to move the individual brake shoes into frictional engagement with the respective wheels W of the railroad car. It will be noted that the tank 51 and the hand lever 52 are positioned so that the hand brake can be easily applied by a person standing on a ladder 54 at the end of the railroad car.

In the apparatus thus far described the elements in the pneumatic system and the car trucks represent conventional or standard structure and are present on the majority of the railroad vehicles now in use. However, in place of the mechanical linkage that would normally be connected to the main air cylinder 41 to engage the brake shoes with the wheels, a novel hydraulic system including the master cylinder 43, wheel cylinders 23 to 26, and the hydraulic hand brake has been substituted therefor.

In the operation of the braking system thus far described, a braking action is initiated by a braking signal being applied to the brake-regulating valve 36 in a known manner. Such a braking signal positions the valve to supply air from the reservoir 35A through the conduits 38 and 42 to the main air cylinder 41. The piston and shaft 44 of the main air cylinder is extended axially outwardly to force pressurized hydraulic fluid from the interior of the master cylinder 43 through the conduits 46 and 47 to the individual wheel cylinders. The pistons of the individual wheel cylinders are in turn actuated outwardly of the respective cylinders to engage the brake shoes in frictional contact with the wheels and brake the car 21. Alternatively, the brakes may be applied by a person pumping the hand lever 53 to transmit pressurized hydraulic fluid through the conduit 52 to the interior of the master cylinder 43 and thence to the individual wheel cylinders.

Figure 4:
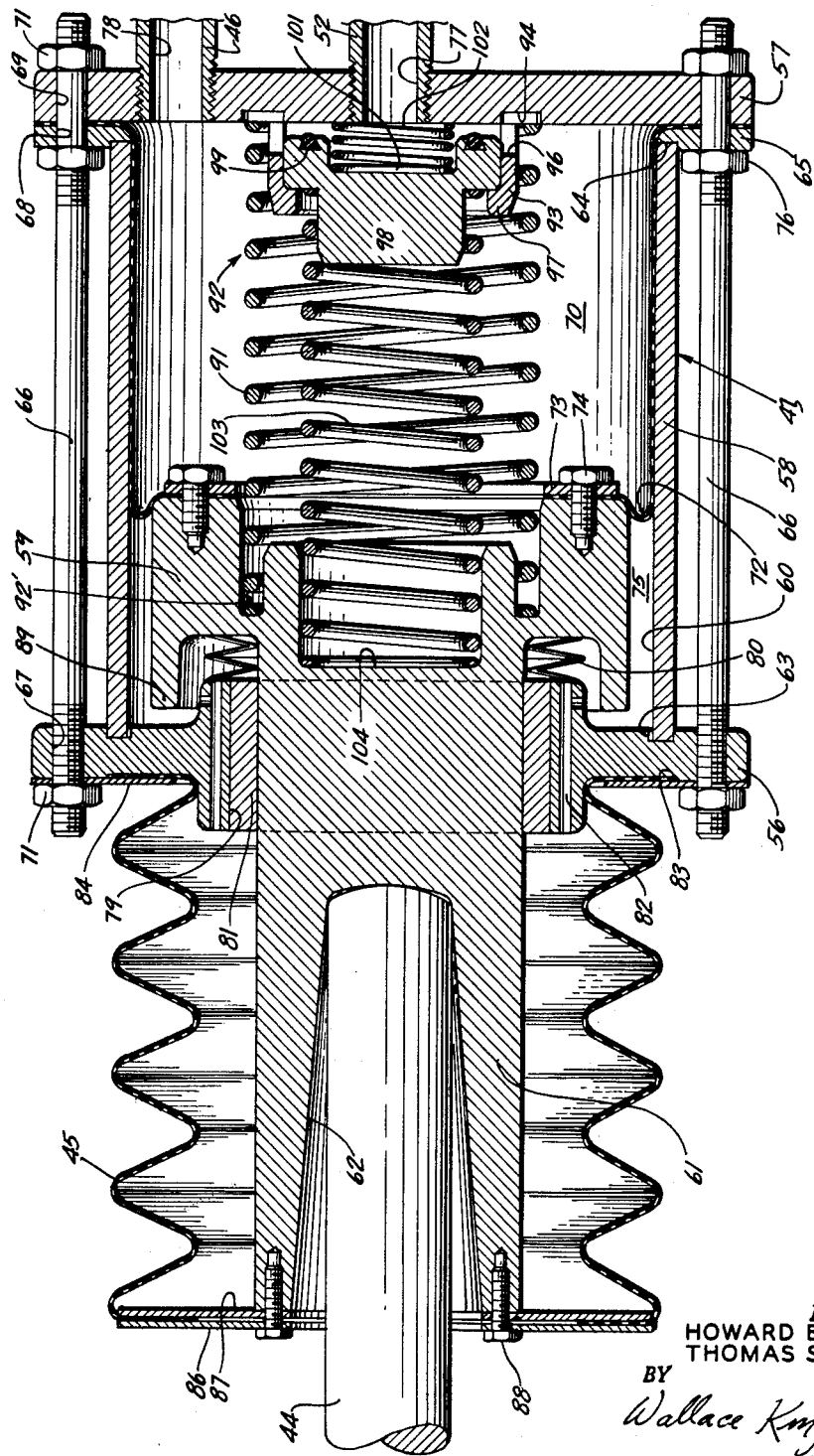
FIG. 4 is a sectional view on an enlarged scale of one embodiment of a hydraulic master cylinder utilized in the arrangement illustrated in FIG. 1.

Referring now to FIG. 4 of the drawings, there is illustrated a detailed sectional view of the master cylinder 41. The cylinder 41 comprises a pair of end plates 56 and 57 and a tubular housing 58 which extends therebetween and provides an inner bore 60 within the master cylinder. A main piston 59 is axially reciprocable within the bore 60 and includes a shank 61 of reduced diameter which has a tapered recess at 62 formed in an end thereof. The shaft 44 of the main air cylinder 41 is received within the recess 62 and is operative upon actuation of the main air cylinder to force the piston 59 inwardly of the master cylinder in the manner described hereinabove. The housing 58 is retained within an annular recess 63 in the end plate 56 and a recess 64 formed in the radially inner portion of an annular flange 65. The flange 65 is in turn supported from the inner face of the end plate 57. A plurality of tie rods 66 extend through apertures 67, 68 and 69 in the respective end plate 56, flange 65, and end plate 57 and nuts 71 are threaded on the ends of the tie rods to pull the end plates toward one another and retain the tubular housing 58 therebetween.

The external diameter of the piston 59 is somewhat smaller than the internal diameter of the tubular housing 58, and a long stroke diaphragm 72 is fastened to the head of the piston and the outer cylinder to provide a positive, non-leaking sealing arrangement between the piston and the outer housing. The inner flange of the diaphragm 72 is clamped between the head of the piston 59 and a pressure plate 73 by a plurality of cap screws 74. The outer flange of the diaphragm 72 is clamped between an end plate 57 and the annular flange 65 by nuts 76. Thus, the diaphragm 72 divides the bore 60 into separate chambers 70 and 75.

The end plate 57 has a first, centrally located aperture 77 extending axially therethrough and the conduit 52, which leads to the reservoir, is threaded in the aperture 77. The end plate 57 includes an additional aperture 78, and the conduit 46, which leads to the individual wheel cylinders, is threadedly connected in the aperture 78. Thus, the piston and the long stroke diaphragm define an enclosed volume 70 within the bore 60 of the master cylinder, and this enclosed volume communicates with the reservoir and the wheel cylinders through the conduits 52 and 46.

The end plate 56 is formed with a centrally located aperture 79 which extends axially therethrough and which mounts a sleeve-type bearing 81 therein. The sleeve bearing 81 in turn encircles and supports the shank 61 of the piston. The end plate 56 also includes a plurality of holes 82 which extend axially through the end plate and which are disposed radially outwardly of the central aperture 79. These holes 82 communicate the interior of the dust guard bellows 45 with that portion of the inner bore 60 which is not filled with hydraulic fluid, and thus act to vent that portion of the inner bore to permit free reciprocation of the piston 59 within the bore. The dust guard bellows 45 acts as a shield to prevent the entry of dust or other foreign matter into the inner bore as a result of such venting action through the communicating holes 82.

The dust guard bellows 45 is clamped at opposite ends to end plate 56 and the outermost end of the shank 61 to provide a fluid-tight seal around the shank 61. The connection to the end plate 56 is afforded by a slight recess 83 in one face of the end plate and a pressure plate 84. The pressure plate 84 is interposed between the nut 71 and the end plate 56 so as to firmly clamp the outer flange of the bellows 45 which is received within the recess 83. The connection to the shank is afforded by a pair of relatively thin plates 86 and 87 which receive the inner flange of the bellows 45 therethrough and which are clamped together by a plurality of cap screws 88 threaded in the outer end of the shank 61.

The piston 59 is formed with an annular flange 89 at the base end thereof and this flange 89 serves as a support for a portion of the long-stroke diaphragm when the piston is at maximum stroke. A high rate spring stack 80 is interposed between the piston 59 and the inner face of the end plate 56, and under certain conditions, such as those noted hereinafter, results in an accumulator effect in the master cylinder to provide compensation for temperature variations, and consequent volume variations in the hydraulic fluid during operation of the hand brake in a manner presently to be described.

A return spring 91 is seated at opposite ends on the inner face of the end plate 57 and the base surface of an annular recess 92' which is formed in the head of the piston 59. The spring 91 affords a biasing force for returning the piston 59 to the position illustrated in FIG. 4 at the completion of a brake actuating stroke of the master cylinder.

Valve means, indicated generally by the reference numeral 92, are disposed within the chamber 70 adjacent the end of the conduit 52 which is connected to the hydraulic reservoir. The valve means 92 are normally open, as illustrated in FIG. 4, to communicate the chamber 70 with the hydraulic reservoir, but are movable to a closed position to interrupt the communication between the master cylinder and the reservoir during a pressure-transmitting stroke of the piston 59.

The valve means 92 include an annular housing 93 which has a flanged portion seated within a recess 94 in the inner face of the end plate 57. The annular housing 93 includes a plurality of slots 96 which form ports for communicating the chamber 70 with the conduit 52. The annular housing 93 also includes a radially inwardly projecting lip or flange 97 at the axially innermost end of the housing. A piston 98 is axially slidable within the housing 93 between the positions limited by the lip 97 and the inner faces of the end plate 57. The piston 98 has an annular groove formed in the face which engages the end plate 57, and an O-ring 99 is mounted in the groove and is compressed to provide a fluid-tight seal when the piston 98 abuts the end plate 57. In this position of the piston the communication of the bore 60 with the reservoir through the conduit 52 is interrupted. Thus, the piston 98 acts as a valve element to regulate fluid flow through the slots 96. The surface of the piston 98 which faces the end plate 57 is also provided with a circular recess 101 and a return spring 102 is seated at opposite ends in the recess 101 and the inner face of the end plate 57. The spring 102 affords a biasing force for returning the piston 98 to the normally open position as illustrated in FIG. 4.

Another coil spring 103 is seated at one end on the surface of the piston 98 which faces the main piston 59. The other end of the coil spring 103 is seated within a circular recess 104 formed in the head of the main piston 59. As seen in FIG. 4, the return springs 91 and 103 are oppositely wound, that is, the spring 91 is right-hand wound and the spring 103 is left-hand wound to minimize twisting on the diaphragm 72 due to spring rotational forces when the springs 91 and 103 are compressed. The minimizing of twisting on a diaphragm is of particular importance where a long stroke, rolling diaphragm such as the diaphragm 72 is employed. The spring 103 is so adjusted that it is just unloaded when the main piston 59 is in the position shown in FIG. 4. Spring 80 has a high rate and is compressed only slightly under this circumstance.

It should be noted at this time that only a slight amount of movement of the main piston 59 inwardly of the master cylinder is required for the force developed by the spring 103 to become sufficient to overcome the force afforded by the spring 102 and move the piston 98 rightwardly, as viewed in FIG. 4, to a position wherein the O-ring 99 is compressed and seals off the interior of the master cylinder from the hydraulic reservoir.

The over-all operation will now be described with reference to FIGS. 5 to 7. A more detailed description is set forth in the aforesaid application. In these figures, the master cylinder, reservoir, and hand pump, and an individual wheel cylinder are somewhat schematically illustrated. The wheel cylinder is not part of this invention, and its function will be related to the master cylinder. Certain structural parts however correspond to the parts described in detail with reference to FIG. 4 and like reference numerals are used to designate like parts but with the addition of the suffix "A" in FIG. 5, "B" in FIG. 6, and "C" in FIG. 7.

In FIG. 5 the disposition of the parts illustrated is that assumed with the system at rest but with the automatic slack adjuster mechanism of the wheel cylinder 20A operative to compensate for a slight amount of brake shoe wear as noted by the legend.

In FIG. 5 the valve 158A in the hydraulic reservoir is open so that the reservoir communicates through the conduit 52A and the ports 96A with the chamber 70A of the master cylinder to replenish any quantity of fluid which may have been required by operation of the slack adjusters in the individual wheel cylinders.

In FIG. 6 the disposition of the parts of the hydraulic system is that assumed subsequent to a braking action resulting from an actuation of the main air cylinder of the pneumatic system. In such pneumatic actuation of the system, the air cylinder shaft 44B moves the piston 59B of the master cylinder inwardly of the cylinder and displaces hydraulic fluid from the chamber 70B to the individual wheel cylinders. The pressure generated by such movement of the piston 59B is transmitted through the hydraulic fluid within the chamber 70B and acts in conjunction with the force of the spring 103B to move the piston 98B against the bias of the return spring 102B to the position wherein the sides of the piston cover the ports 96B and the seal 99B is compressed to a fluid-tight, sealing relation with the inner face of the end plate 57B to thereby seal off the conduit 52B and prevent any loss of pressure from the chamber 70B. In this instance the positions of the parts of the hand pump are the same as that illustrated in FIG. 5.

In FIG. 6 the parts of the wheel cylinder 20B are illustrated as being positioned to supply hydraulic fluid from the master cylinder to the chamber 119B of the wheel cylinder to compensate for some wearing down of the brake shoe. Thus, the slack adjuster piston 131B is shown engaged with the stop 134B. In this position of the slack adjuster piston the ports 128B are uncovered and hydraulic fluid is admitted the chamber 119B to move the main piston 113B outwardly of the cylinder and independently of any axial movement of the slack adjuster piston. Upon cessation of the braking effort, as applied by the shaft 44B, the return spring 126B is effective to move the pistons 113B and 131B leftwardly as viewed in FIG. 6 to close the ports 128B and trap the extra slack adjusting make-up fluid admitted to the chamber 119B.

In FIG. 7 the disposition of the parts of the hydraulic system is that produced by actuation of the hand brake. In this instance the valve 158C is closed so that downward movement of the hand operated piston 168C to the position illustrated in FIG. 7 is effective to overcome the bias of the spring 202C and move the check valve 201C to an open position wherein the pressurized fluid within the chamber 181C is displaced from the chamber and through the conduit 52C to the master cylinder. This flow of pressurized fluid passes through the ports 96C of the normally open valve 92C and thereafter flows from the chamber 70C through the conduit 46C to the wheel cylinder 20C to actuate this wheel cylinder in the same manner as if the braking action were initiated by the main pneumatic cylinder. As shown in FIG. 7, the spring 80 is slightly compressed whereby the master cylinder takes on the characteristics of an accumulator.

Thus, under normal conditions (see FIGS. 4 and 5) the free end of the flange 89 is located forwardly of the forwardmost surface of the end plate 56, and the spring stack 80 is normally expanded to an inoperative state as illustrated in FIG. 4. In other words, the spring stack 80 normally locates the piston 59 forwardly of its rearwardmost position in the cylinder. However, when the hand brake is applied forcing fluid from the reservoir past the open valve 92 and from thence to the wheel cylinders, the piston 59 is, at the same time, forced to the left as viewed in FIG. 4 against the return action of the spring 80, by pressurized fluid at the forward side of the piston 59, which is contracted.

Such action of the piston 59 converts the master cylinder into an accumulator, and should there be a leak, or should temperature changes contract the fluid, the spring stack 80 will expand to deliver pressurized make-up fluid while the car is standing idle with the brake set. As a further example, should the handbrake be applied at a low temperature and a subsequent rise in temperature occur, such would cause such an expansion in the fluid as would overstress some component part of the system, but this will be prevented by the inherent ability of the spring 80 to contract due to correspond movement of the piston 59. Alternatively the brakes might be applied at a comparatively high hydraulic fluid temperature and a subsequent drop in temperature could cause contraction of the fluid and release of the brakes, but in accordance with this invention the spring stack 80 affords compensation, noting again that the spring 80 is a high rate spring.

In FIG. 7 the parts of the wheel cylinder 20C are again illustrated as being positioned to compensate for slack caused by wearing down of the brake shoe.

The hydraulic brake system constructed in accordance with this invention includes a master cylinder enabling advantageous results to be realized, and in particular allows for prompt closure of the inlet leading to the reservoir upon forward movement of the piston, and allows for a long stroke of the piston while effectively sealing the chamber 70. Moreover, the master cylinder may become an accumulator during a hand brake operation in view of the way in which the spring 80 is arranged therein in association with the piston 59.

Hence, while we have illustrated and described a preferred embodiment of our invention, it is to be understood that this is capable of variation and modification, and we therefore do not wish to be limited to the precise details set forth, but desire to avail ourselves of such changes and alterations as fall within the purview of the following claim.

We claim:

In a hydraulic master cylinder of the kind having a piston reciprocal with an inner bore; means affording an inlet to the bore adapted to be connected to a reservoir of hydraulic fluid being selectively operable to compensate for the amount of fluid within the bore; means affording an outlet for the bore adapted to be connected to a hydraulic power cylinder; valve means for regulating the fluid flow through the inlet; resilient means normally biasing the valve means to an open position for communicating said inlet with said bore and said outlet, whereby the reservoir may provide hydraulic fluid to compensate for variations in volume of the hydraulic fluid, said valve means being moveable to a close position against the bias of said resilient means by actuation of the piston in a forward direction to thereby block fluid flow from the bore to the inlet of the master cylinder; a normally expandable spring means positioned between the end wall of the bore and the rear of the piston and effective to space the piston forwardly of its rearwardmost position in the cylinder, and said spring means being adapted to be contracted by fluid under pressure at the forward side of the piston when said reservoir of hydraulic fluid is inoperable so that said spring means may move said piston within said bore to compensate for variations in volume of the hydraulic fluid; a return spring means for returning said piston to a position within said bore, and a valve closing spring means reversely wound to said return spring means and operable by said piston to close said valve means.

References Cited in the file of this patent

UNITED STATES PATENTS

| | | |
|---|---|---|
| 1,847,402 | Loughead | Mar. 1, 1932 |
| 2,037,474 | Loweke | Apr. 14, 1936 |
| 2,126,296 | Weihe | Aug. 9, 1938 |
| 2,178,490 | Neilsen | Oct. 31, 1939 |
| 2,470,954 | Rockwell | May 24, 1949 |
| 2,643,518 | Righter | June 30, 1953 |
| 3,044,265 | Schwartz | July 17, 1962 |
| 3,053,349 | Huntress | Sept. 11, 1962 |

FOREIGN PATENTS

| | | |
|---|---|---|
| 881,879 | France | Feb. 4, 1943 |